US010789732B2

(12) United States Patent
Terada et al.

(10) Patent No.: US 10,789,732 B2
(45) Date of Patent: Sep. 29, 2020

(54) APPARATUS AND METHOD FOR MONITORING SURROUNDINGS OF VEHICLE

(71) Applicants: DENSO CORPORATION, Kariya, Aichi-pref. (JP); TOYOTA JIDOSHA KABUSHIKI KAISHA, Toyota-shi, Aichi-ken (JP); RICOH COMPANY, LTD., Tokyo (JP)

(72) Inventors: Toshihiko Terada, Kariya (JP); Hiroaki Ito, Toyota (JP); Naohide Uchida, Numazu (JP); Kagehiro Nagao, Tokyo (JP)

(73) Assignees: DENSO CORPORATION, Kariya, Aichi-Pref. (JP); TOYOTA JIDOSHA KABUSHIKI KAISHA, Toyota-Shi, Aichi-Ken (JP); RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/146,035

(22) Filed: Sep. 28, 2018

(65) Prior Publication Data

US 2019/0102912 A1     Apr. 4, 2019

(30) Foreign Application Priority Data

Sep. 29, 2017 (JP) .................. 2017-192065

(51) Int. Cl.
*G06T 7/73* (2017.01)
*H04N 13/239* (2018.01)
(Continued)

(52) U.S. Cl.
CPC .................. *G06T 7/85* (2017.01); *G06T 7/74* (2017.01); *H04N 13/239* (2018.05);
(Continued)

(58) Field of Classification Search
CPC ...... G06K 9/00805; G06T 2207/30252; B60R 2011/004
See application file for complete search history.

(56) References Cited

U.S. PATENT DOCUMENTS 6,466,684 B1 * 10/2002 Sasaki ................ G06K 9/00798
340/435
6,552,742 B1 4/2003 Seta
(Continued)

FOREIGN PATENT DOCUMENTS

JP    3280001 B2    4/2002
JP    5440461 B2    3/2012

*Primary Examiner* — Paulos M Natnael
(74) *Attorney, Agent, or Firm* — Maschoff Brennan

(57) ABSTRACT

In an apparatus for monitoring surroundings of a vehicle carrying the apparatus, a corresponding-point displacement calculator sets a search region for corresponding points in a plurality of images of an object captured simultaneously from different positions and calculate a displacement value between the corresponding points. A search region modifier modifies the search region if a number of corresponding-point displacement values acquired by the corresponding-point displacement calculator within a predetermined period of time is less than a predetermined threshold. An image displacement calculator calculates an image displacement value that is an amount of displacement between the plurality of images based on the corresponding-point displacement values acquired within the predetermined period of time if the number of corresponding-point displacement values acquired by the corresponding-point displacement calculator within the predetermined period of time is equal to or greater than the predetermined threshold. A displacement corrector corrects for an image displacement based on the image displacement value.

3 Claims, 3 Drawing Sheets

(51) Int. Cl.
  *G06T 7/80* (2017.01)
  *H04N 13/296* (2018.01)
  *G06K 9/62* (2006.01)

(52) U.S. Cl.
  CPC ......... *H04N 13/296* (2018.05); *G06K 9/6202* (2013.01); *G06T 2207/10012* (2013.01); *G06T 2207/30244* (2013.01); *G06T 2207/30252* (2013.01)

(56) References Cited

U.S. PATENT DOCUMENTS

| | | | | |
|---|---|---|---|---|
| 6,987,534 | B1* | 1/2006 | Seta | G01S 11/12 |
| | | | | 348/229.1 |
| 7,386,226 | B2* | 6/2008 | Miyoshi | H04N 13/133 |
| | | | | 396/89 |
| 9,555,803 | B2* | 1/2017 | Pawlicki | B60W 30/18 |
| 2006/0077543 | A1* | 4/2006 | Miyoshi | H04N 13/133 |
| | | | | 359/407 |
| 2011/0074955 | A1* | 3/2011 | Kuehnle | G01W 1/14 |
| | | | | 348/148 |
| 2012/0076260 | A1* | 3/2012 | Kitagawa | A61B 6/022 |
| | | | | 378/41 |
| 2012/0224069 | A1 | 9/2012 | Aoki | |
| 2012/0327238 | A1* | 12/2012 | Satoh | B60R 1/00 |
| | | | | 348/148 |
| 2019/0095761 | A1* | 3/2019 | Terada | G06K 9/00791 |
| 2019/0102901 | A1* | 4/2019 | Terada | H04N 13/243 |

* cited by examiner

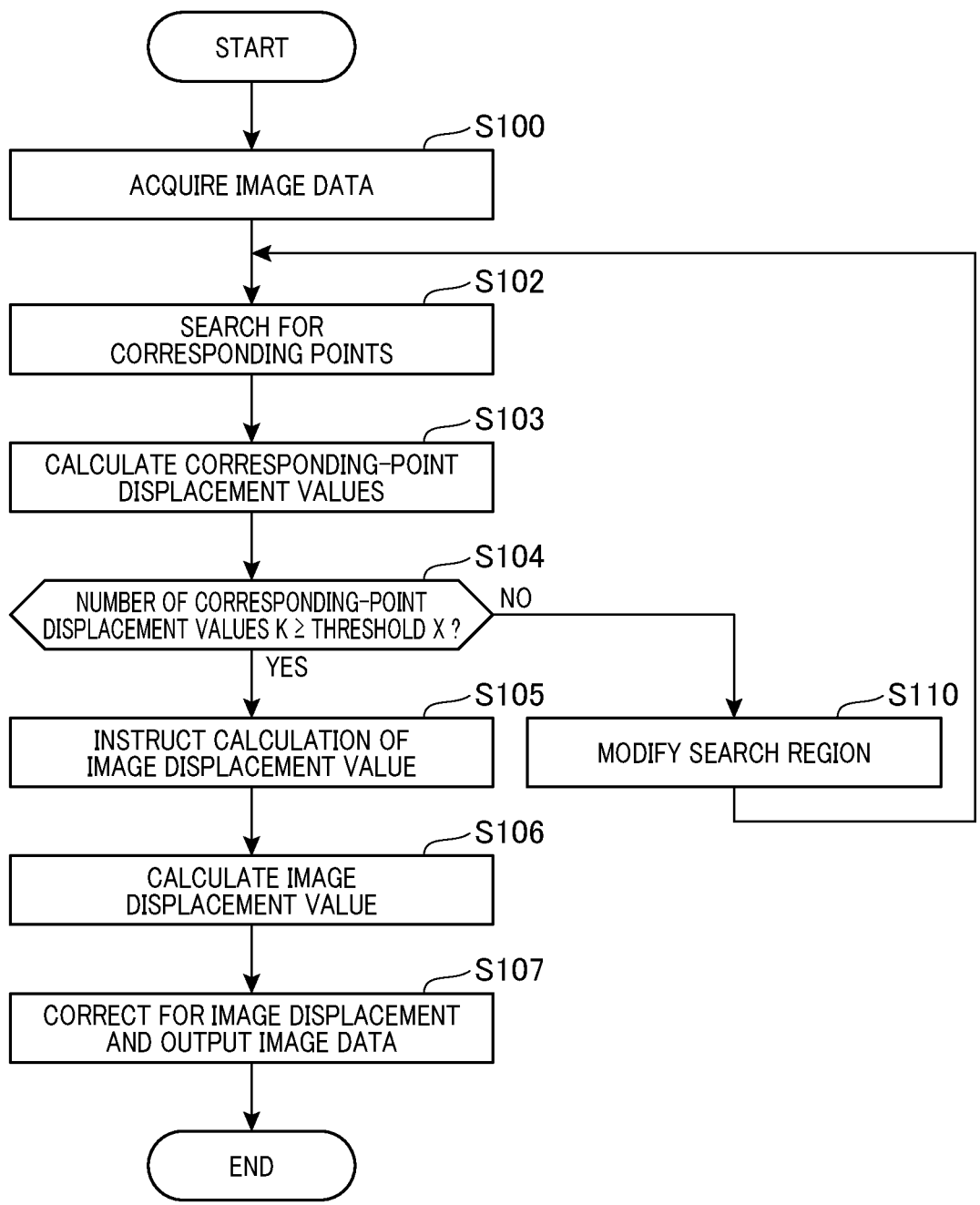

APPARATUS AND METHOD FOR MONITORING SURROUNDINGS OF VEHICLE

CROSS-REFERENCE TO RELATED APPLICATION

This application is based on and claims the benefit of priority from earlier Japanese Patent Application No. 2017-192065 filed on Sep. 29, 2017, the description of which is incorporated herein by reference.

BACKGROUND

Technical Field

This disclosure relates to an apparatus and a method for monitoring surroundings of a vehicle using images captured simultaneously by a plurality of imagers.

Related Art

Stereo matching is known as a technique for calculating a distance to an object based on the disparity between a pair of images captured simultaneously by a pair of imagers, such as a stereo camera. The stereo matching includes searching for corresponding points (i.e., feature points) in the pair of images corresponding to each other and determining the disparity between the corresponding points to calculate a distance to the object. However, a misalignment between the pair of imagers may cause an error in the disparity acquired from the pair of images, which may decrease the calculation accuracy of the distance to the object. To preserve the distance measurement accuracy, positions of the pair of imagers are accurately adjusted prior to product delivery. Nonetheless, accurate positions of imagers may not be preserved due to vibrations or temperature changes during driving of the vehicle.

Thus, there are known some techniques for calculating an amount of displacement or shift between the positions of the corresponding points caused by the misalignment between the imagers and thereby calibrating the imagers. As an example, a technique as disclosed in Japanese Patent No. 5440461 performs a matching process between a plurality of images acquired from a plurality of imagers to search for a plurality of corresponding points in the images, and based on a displacement between the plurality of corresponding points, correct for an image displacement or shift caused by the misalignment between the imagers.

Preferably, in the stereo matching process, the size of the search region may appropriately be set for the displacement value between the corresponding points. The size of the search region needs to be set greater than the displacement value between the corresponding points. Therefore, a larger search region may be preferable to accommodate a wide range of displacement values between the corresponding points. However, setting a too large search region may decrease the matching speed and thus decrease the calculation accuracy of the displacement value between the corresponding points.

In view of the above, it is desired to have an apparatus and a method for monitoring surroundings of a vehicle using images captured simultaneously by a plurality of imagers, capable of accommodating a wide range of displacement values between corresponding points in the images while preserving the matching speed and accuracy.

SUMMARY

One aspect of the disclosure provides an apparatus for monitoring surroundings of a vehicle carrying the apparatus. In the apparatus, an image acquirer is configured to acquire a plurality of images of an object captured simultaneously from different positions. A corresponding-point displacement calculator is configured to set a search region for corresponding points in the plurality of images and calculate a displacement value between the corresponding points. A search region modifier is configured to, if a number of corresponding-point displacement values acquired by the corresponding-point displacement calculator within a predetermined period of time is less than a predetermined threshold, modify the search region: an image displacement calculator configured to, if the number of corresponding-point displacement values acquired by the corresponding-point displacement calculator within the predetermined period of time is equal to or greater than the predetermined threshold, calculate an image displacement value that is an amount of displacement between the plurality of images based on the corresponding-point displacement values acquired within the predetermined period of time. A displacement corrector is configured to correct for an image displacement based on the image displacement value calculated by the image displacement calculator.

In the surroundings monitoring apparatus configured as above, the search region modifier is configured to, if the number of corresponding-point displacement values acquired by the corresponding-point displacement calculator within the predetermined period of time is less than the predetermined threshold, modify the search region used by the corresponding-point displacement calculator to search for corresponding points of the reference image and the comparison image. That is, if the search region is set inappropriately and thus a sufficiently large number of corresponding-point fail to be acquired, the search region modifier can adjust the search region and calculate the corresponding point displacement values using the adjusted search region. With this configuration, the displacement calculator can calculate the image displacement value using a sufficiently large number of corresponding point displacement values, which may increase the calculation accuracy of the image displacement values. The search region modifier can adjust the search region. For example, normally, the search region is set to prioritize the matching speed and accuracy. If, exceptionally, the number of corresponding-point displacement values acquired within the predetermined period of time is less than the predetermined threshold, the search region is enlarged. With this configuration, the surroundings monitoring apparatus can accommodate a wide range of corresponding-point displacement values while ensuring the processing speed and accuracy.

Another aspect of the disclosure provides a method for monitoring surroundings of a vehicle. The method including: acquiring a plurality of images of an object captured simultaneously from different positions; setting a search region for corresponding points in the plurality of images and calculate a displacement value between the corresponding points; modifying the search region if a number of corresponding-point displacement values acquired by the corresponding-point displacement calculator within a predetermined period of time is less than a predetermined threshold: calculating an image displacement value that is an amount of displacement between the plurality of entire images based on the corresponding-point displacement values acquired within the predetermined period of time if the number of corresponding-point displacement values acquired by the corresponding-point displacement calculator within the predetermined period of time is equal to or greater than the predetermined threshold; and correcting for an image displacement based on the image displacement value calculated by the image displacement calculator.

BRIEF DESCRIPTION OF THE DRAWINGS

FIG. 3 is a flowchart of processing performed by the surroundings monitoring apparatus.

DESCRIPTION OF SPECIFIC EMBODIMENTS

Figure 1:
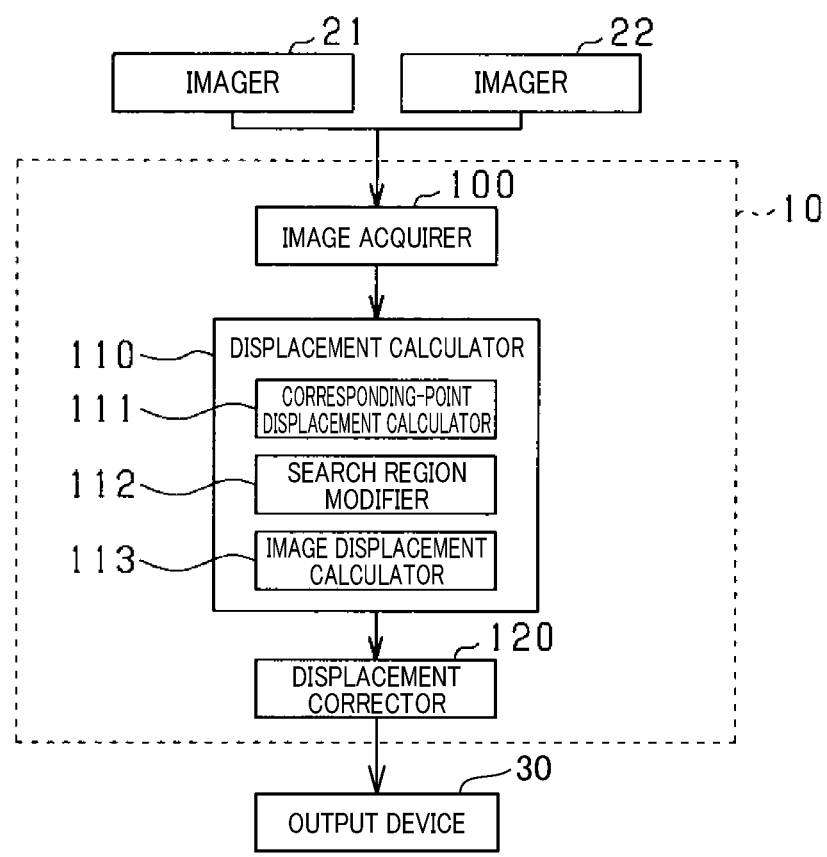
FIG. 1 is a block diagram of a surroundings monitoring apparatus in accordance with one embodiment of the present disclosure.

As shown in FIG. 1, the surroundings monitoring apparatus 10 includes an image acquirer 100, a displacement calculator 110, a displacement corrector 120. The surroundings monitoring apparatus 10 may be configured as electronic control unit (ECU) including an analog-to-digital (A/D) converter circuit, an input/output interface (I/O), a central processing unit (CPU), a read-only memory (ROM), and a random-access memory (RAM), an image memory and other components. Various functions described later of the surroundings monitoring apparatus 10 may be implemented by the CPU executing programs stored in the ROM or the like. Alternatively or additionally to the CPU, the surroundings monitoring apparatus 10 may include a field-programmable gate array (FPGA) having a digital processing circuit.

Signals output from the imagers 21, 22 are converted into digital signals and are then output to the CPU of the surroundings monitoring apparatus 10. The surroundings monitoring apparatus 10 calculates an amount of displacement or shift between the input images caused by a misalignment between the imagers 21, 22 to correct the images. The surroundings monitoring apparatus 10 may output corrected image data and control signals based on the corrected image data to external devices, such as an alert device, a display device, and a driving controller.

The imagers 21, 22 form a stereo camera. Each of the imagers 21, 22 may include a charge-coupled device (CCD) camera, a complementary metal-oxide semiconductor (CMOS) image sensor, a near-infrared camera or the like. The imagers 21, 22 are disposed behind a rearview mirror of a vehicle with a predefined baseline length in a widthwise direction of the vehicle. The imagers 21, 22 capture images of surroundings of the vehicle, including a road forward of the vehicle and a preceding vehicle. The imager 21 and the imager 22 are synchronized with each other to simultaneously capture a pair of images of surroundings of the vehicle. A reference image To captured by the imager 21 and a comparison image Tc captured by the imager 22 are output to the image acquirer 100.

The image acquirer 100 acquires images captured simultaneously by the pair of imagers 21, 22, thereby acquiring a pair of images of the same object captured from different positions. The image acquirer 100 converts the pair of analog images To, Tc acquired from imagers 21, 22 into grayscale (e.g., 256-level grayscale) digital images via the analog-to-digital (A/D) converter circuit and outputs the digital images to the displacement calculator 110. Such digitized image data is expressed in an i-j coordinate system having an origin at the upper left corner. In the i-j coordinate system, the i-coordinate axis lies in a horizontal direction and the j-coordinate axis lies in a vertical direction.

The displacement calculator 110 calculates an amount of displacement between the pair of images To, Tc acquired from the image acquirers 100 and then outputs the calculated amount of displacement to the displacement corrector 120. The displacement calculator 110 makes a corresponding-point search on the images To, Tc to calculate an amount of displacement between each pair of corresponding points in the images To, Tc, caused by the misalignment between the imagers 21, 22. The displacement calculator 110 includes a corresponding-point displacement calculator 111, a search region modifier 112, and an image displacement calculator 113.

The corresponding-point displacement calculator 111 sets a search region in the comparison image Tc to search for corresponding points in each pair of images To, Tc and calculates a corresponding-point displacement value d (e.g., in pixel units) that is an amount of displacement between the corresponding points in the pair of images To, Tc. The search region of the comparison image Tc is used to search for a certain pixel region of the reference image To, and is normally set broader than the pixel region of the reference image To to be searched for. Preferably, the size of the search region of the comparison image Tc is appropriately set for the corresponding-point displacement value d. Setting a too large search region in the comparison image Tc for the corresponding-point displacement value d may decrease the calculation accuracy of the corresponding-point displacement value d, which may increase the processing load for the corresponding-point displacement calculator 111 to calculate the corresponding point displacement value d. Setting a too small search region in the comparison image Tc for the corresponding-point displacement value d may lead to a failure to detect a corresponding point within the search region, which may make it difficult to properly calculate the corresponding-point displacement value d.

The corresponding-point displacement calculator 111 performs stereo matching processing between the reference image To and the comparison image Tc to determine corresponding positions of the same point in the reference image To and the comparison image Tc. More specifically, the corresponding-point displacement calculator 111 searches for an region of pixels within the search region of the comparison image Tc, which matches a certain region of pixels of the reference image To, A well-known regional search method may be used in the stereo matching processing performed by the corresponding-point displacement calculator 111, thereby evaluating a degree of correlation between the reference image To and the comparison image Tc. In the present embodiment, the Sum of Absolute Differences (SAD) is used, where a sum of absolute differences in pixel value between small regions (or blocks) in the reference image To and the comparison image Tc is calculated as an evaluation function of the degree of correlation. A pixel brightness value is commonly used as the pixel value.

In the SAD method, a value of the evaluation function is referred to as a city-block distance. The city-block distance decreases with increasing degree of correlation (or similarity) between blocks in the reference image To and the comparison image Tc. The disparity is given by an amount of horizontal shift between blocks in the reference image To and the comparison image Tc, by which the evaluation function is minimized. The city-block distance CB is expressed by the following equation:

$$CB = \Sigma |M(i,j) - S(i,j)| \quad (1)$$

where M(i, j) (i=0–n, j=0–n) represents a pixel value of each pixel of a search block M in the reference image To and S(i, j) (i=0–n, j=0–n) represents a pixel value of each pixel of a search block S in the comparison image Tc. The indices i and j respectively represent horizontal and vertical Cartesian coordinates of each pixel of each search block. In each search block, the pixel position (i+1, j) is horizontally shifted from the pixel position (i, j) by a predetermined shift value along the i-axis, and the pixel position (i, j+1) is vertically shifted from the pixel position (i, j) by a predetermined shift value along the j-axis. The sum is taken over all the i-j pairs.

Figure 2:
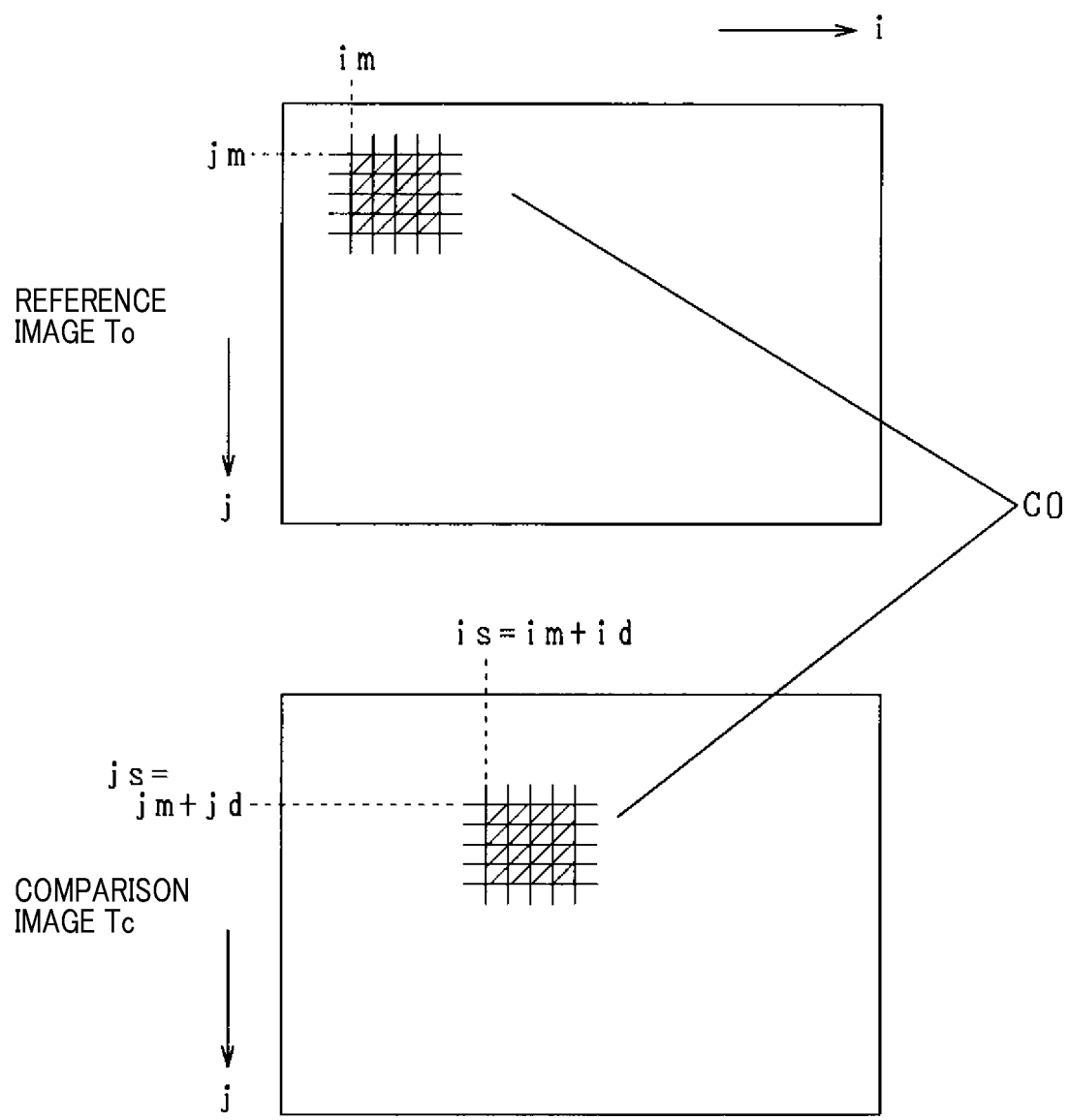
FIG. 2 is an example of stereo matching.

For example, for each search block (main block) of 4×4 pixels of the reference image To, the corresponding-point displacement calculator 111 sets a search region in the comparison image Tc, which includes several search blocks (sub-blocks) of 4×4 pixels. The corresponding-point displacement calculator 111 calculates a city-block distance between the main block of the reference image To and each of the sub-blocks included in the search region of the comparison image Tc according to the equation (1) of the SAD evaluation function. As shown in FIG. 2, corresponding positions of the main block and one of the sub-blocks, having the highest degree of correlation therebetween, are determined as a matching point at which the city-block distance takes a minimum value CO. At the matching point, an amount of displacement in pixel units between the main block and the one of the sub-blocks, that is, a difference between coordinates (im, jm) of the main block and coordinates (is, js) of the one of the sub-blocks yields a corresponding-point displacement value d with resolution in pixel units. Referring to FIG. 2, the corresponding-point displacement value d may be expressed as a 2-dimensional vector: d=(is, js)−(im, jm)=(id, jd) where is=im+id, js=jm+jd, and id and jd are i-axis and j-axis components of the vector. For the pair of the reference image To and the comparison image Tc, the corresponding-point displacement value d is calculated for each search block of the reference image To. Therefore, such calculations for all the search blocks of the entire reference image To will yield a plurality of corresponding-point displacement values d. These corresponding-point displacement values calculated over the reference image To may be stored in the storage (RAM or the like) of the surroundings monitoring apparatus 10.

The search region modifier 112 evaluates the reliability of the corresponding point displacement values d calculated by the corresponding-point displacement calculator 111. If the search region modifier 112 determines that the set of corresponding-point displacement values d are not sufficiently reliable, then the search region modifier 112 modifies the search region set by the corresponding-point displacement calculator 111. The search region modifier 112 may change the size of the search region in at least one of horizontal and vertical directions of the comparison image Tc. As shown in FIG. 2, the horizontal and vertical directions are respectively the i-axis and j-axis directions.

More specifically, the search region modifier 112 counts the number k of corresponding-point displacement values d acquired by the corresponding-point displacement calculator 111 within a predetermined period of time. If the number k of corresponding-point displacement values d is less than a predetermined threshold X (k<X), then the search region modifier 112 modifies the search region set by the corresponding-point displacement calculator 111.

The size of the search region needs to be set greater than the corresponding-point displacement values d. For example, if the search region is too small for the corresponding positions, a matching point between the reference image To and the comparison image Tc may fail to be determined, which may result in a small number of corresponding-point displacement values d acquired by the corresponding-point displacement calculator 111 within the predetermined period of time. The search region modifier 112 sets a larger search region in the comparison image Tc if the number k of corresponding-point displacement values d acquired by the corresponding-point displacement calculator 111 within the predetermined period of time is less than the predetermined threshold X (k<X). This allows the corresponding-point displacement calculator 111 to search for corresponding points of the reference image To and the comparison image Tc within the search region enlarged by the search region modifier 112. The search region sufficiently enlarged for the corresponding-point displacement values d enables acquiring a sufficiency large number of corresponding-point displacement values d within the predetermined period of time.

For example, normally, the surroundings monitoring apparatus 10 may set a small search region to prioritize the processing speed and accuracy of the corresponding-point displacement calculator 111. If, exceptionally, the number k of corresponding-point displacement values d acquired by the corresponding-point displacement calculator 111 within the predetermined period of time is less than the predetermined threshold X (k<X), the search region modifier 112 may enlarge the search region. With this configuration, the surroundings monitoring apparatus 10 can accommodate a wide range of corresponding-point displacement values while ensuring the processing speed and accuracy of the corresponding-point displacement calculator 111.

If the number k of corresponding-point displacement values d is equal to or greater than the predetermined threshold X (k≥X), then the search region modifier 112 instructs the image displacement calculator 113 to calculate an image displacement value G based on the set of corresponding point displacement values d. The image displacement value G is an amount of displacement between the entire reference image To and the entire comparison image Tc.

Upon receipt of the instruction from the search region modifier 112, the image displacement calculator 113 calculates the image displacement value G based on the set of corresponding point displacement values d calculated by the corresponding-point displacement calculator 111. Similar to the corresponding point displacement values d, the image displacement value G may be calculated in pixel units. The image displacement calculator 113 may calculate an arithmetic average of the corresponding point displacement values d as the image displacement value G. In an alternative embodiment, the image displacement calculator 113 may perform statistical processing, such as regression analysis using a normal distribution, a multinomial distribution, a binomial distribution, or a Poisson distribution, to calculate the image displacement value G.

If the number k of corresponding-point displacement values d is less than the predetermined threshold X (k<X), then the search region modifier 112 will not transmit the instruction for calculating the image displacement value G. Thus, the image displacement calculator 113 will not calculate the image displacement value G. With this configuration, the image displacement calculator 113 can calculate the image displacement value D using the threshold or greater number of corresponding-point displacement values d, that is, a sufficiently large number of corresponding-point displacement values d, and can therefore accurately calculate the image displacement value G. The calculated image displacement value G may be stored in the storage (RAM or the like) of the surroundings monitoring apparatus 10.

The displacement calculator 110 transmits to the displacement corrector 120 the image displacement value G, as well as the image data of the reference image To and the comparison image Tc. The displacement corrector 120 corrects for the image displacement based on the image displacement value G using a well-known method, such as an image shifting method, a higher polynomial method or the like. In the image shifting method, the image data is translated along a coordinate axis. In the higher polynomial method, the image data is coordinate transformed using higher-degree polynomials.

Surroundings monitoring processing performed by the surroundings monitoring apparatus 10 will now be described with reference to FIG. 3. FIG. 3 illustrates a flowchart of the surroundings monitoring processing. This processing is iteratively performed every predetermined time interval.

At step S101, the image acquirer 100 acquires image data captured by the imagers 21, 22. The image data includes a reference image To and a comparison image Tc of the same object captured form different positions. The image data is converted by the image acquirer 100 into digital data and then output to the corresponding-point displacement calculator 111.

Subsequently, at step S102, the corresponding-point displacement calculator 111 sets a search region in the comparison image Tc for each search block of the reference image To, and within the search region, searches for corresponding points in the reference image To and the comparison image Tc. At step S103, the corresponding-point displacement calculator 111 calculates a corresponding-point displacement value d for the corresponding points.

At step S104, the search region modifier 112 determines whether or not the number k of corresponding-point displacement values d is equal to or greater than the predetermined threshold X (k≥X). If the number k of corresponding-point displacement values d is less than the predetermined threshold X (k<X), then at step 110 the search region modifier 112 modifies the search region. The process flow then returns to step S102. At step S102 performed subsequent to step S110, the corresponding-point displacement calculator 111 searches for corresponding points using the search region modified at step S110 to calculate corresponding-point displacement values d.

If at step S104 the search region modifier 112 determines that the number k of corresponding-point displacement values d is equal to or greater than the predetermined threshold X (k≥X), then the process flow proceeds to step S105. At step S105, the search region modifier 112 instructs the image displacement calculator 113 to calculate an image displacement value G between the reference image To and the comparison image Tc based on the set of corresponding-point displacement values d.

Upon receipt of the instruction from the search region modifier 112, the image displacement calculator 113, at step S106, calculates the image displacement value G between the reference image To and the comparison image Tc.

At step S107, the displacement corrector 120 corrects for an image displacement based on the image displacement value G calculated at step S106 and then outputs the image data and control signals to the output device 30.

The present embodiment described above can provide the following advantages.

In the surroundings monitoring apparatus 10 configured as above, if the number k of corresponding-point displacement values d acquired by the corresponding-point displacement calculator 111 within the predetermined period of time is less than the predetermined threshold X (k<X), the search region modifier 112 modifies the search region used by the corresponding-point displacement calculator 111 to search for corresponding points of the reference image To and the comparison image Tc. The corresponding-point displacement calculator 111 searches for corresponding points of the reference image To and the comparison image Tc using the modified search region to calculate corresponding-point displacement values d. The search region is adjustable by the search region modifier 112 in response to the corresponding-point displacement values d, which enables acquiring a sufficiently large number of corresponding-point displacement values d. The image displacement calculator 113 can therefore calculate the image displacement value D based on the sufficiently large number of corresponding-point displacement values d.

In the surroundings monitoring apparatus 10 configured as above, normally, a small search region is set to prioritize the processing speed and accuracy of the corresponding-point displacement calculator 111. And if, exceptionally, the number k of corresponding-point displacement values d acquired by the corresponding-point displacement calculator 111 within the predetermined period of time is less than the predetermined threshold X (k<X), the search region is enlarged. With this configuration, the surroundings monitoring apparatus 10 can accommodate a wide range of corresponding-point displacement values while ensuring the processing speed and accuracy of the corresponding-point displacement calculator 111.

In the embodiment set forth above, the surroundings monitoring apparatus 10 is configured as not including output devices, such as imagers, an alert device, a display device, a driving controller or others. In an alternative embodiment, the surroundings monitoring apparatus 10 may include such output devices, or may be integrated with such output device(s).

What is claimed is:

1. An apparatus for monitoring surroundings of a vehicle carrying the apparatus, comprising:
  an image acquirer configured to acquire a plurality of images of an object captured simultaneously from different positions, the plurality of images being a pair of images captured simultaneously by a stereo camera formed of a pair of imagers mounted on the vehicle;
  a corresponding-point displacement calculator configured to set a search region for corresponding points in the plurality of images and calculate a displacement value between the corresponding points, the displacement value between the corresponding points in the pair of images being an error in disparity caused by a misalignment between the pair of imagers of the stereo camera;
  a search region modifier configured to:
    count a number of corresponding-point displacement values in the plurality of images within a predetermined period of time,
    compare the number of corresponding-point displacement values with a predetermined threshold, and when the number of corresponding-point displacement values is less than the predetermined threshold, enlarge the search region, thereby modifying the search region;

an image displacement calculator configured to, if the number of corresponding-point displacement values acquired by the corresponding-point displacement calculator within the predetermined period of time is equal to or greater than the predetermined threshold, calculate an image displacement value that is an amount of displacement between the plurality of images based on the number of corresponding-point displacement values acquired within the predetermined period of time; and a displacement corrector configured to correct for an image displacement based on the image displacement value calculated by an image displacement calculator.

2. The apparatus according to claim 1, wherein the corresponding-point displacement calculator is configured to set, for each search block of one of the pair of images, the search region in the other of the pair of images, the search region being twice or more times broader than the search block, and search for the corresponding points in the pair of images using the search region.

3. A method for monitoring surroundings of a vehicle, comprising:

acquiring a plurality of images of an object captured simultaneously from different positions, the plurality of images being a pair of images captured simultaneously by a stereo camera formed of a pair of imagers mounted on the vehicle;

setting a search region for corresponding points in the plurality of images and calculate a displacement value between the corresponding points, the displacement value between the corresponding points in the pair of images being an error in disparity caused by a misalignment between the pair of imagers of the stereo camera;

counting a number of corresponding-point displacement values in the plurality of images within a predetermined period of time;

comparing the number of corresponding-point displacement values with a predetermined threshold;

enlarging the search region when the number of corresponding-point displacement values is less than the predetermined threshold;

calculating an image displacement value that is an amount of displacement between the plurality of images based on the number of corresponding-point displacement values acquired within the predetermined period of time if the number of corresponding-point displacement values within the predetermined period of time is equal to or greater than the predetermined threshold; and correcting for an image displacement based on the image displacement value.

* * * * *